United States Patent
Baughman et al.

(10) Patent No.: US 11,412,271 B2
(45) Date of Patent: Aug. 9, 2022

(54) AI RESPONSE TO VIEWERS OF LIVE STREAM VIDEO

(71) Applicant: INTERNATIONAL BUSINESS MACHINES CORPORATION, Armonk, NY (US)

(72) Inventors: Aaron K. Baughman, Cary, NC (US); Sarbajit K. Rakshit, Kolkata (IN); John M. Ganci, Jr., Raleigh, NC (US); Martin G. Keen, Cary, NC (US); James E. Bostick, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/693,760

(22) Filed: Nov. 25, 2019

(65) Prior Publication Data
US 2021/0160547 A1 May 27, 2021

(51) Int. Cl.
*H04N 21/214* (2011.01)
*H04N 21/218* (2011.01)
(Continued)

(52) U.S. Cl.
CPC ......... *H04N 21/2187* (2013.01); *H04N 5/232* (2013.01); *H04N 21/251* (2013.01); *H04N 21/44008* (2013.01); *H04N 21/4788* (2013.01)

(58) Field of Classification Search
CPC ......... H04N 21/21805; H04N 21/2187; H04N 21/4788; H04N 21/44008
See application file for complete search history.

(56) References Cited

U.S. PATENT DOCUMENTS

| 7,546,187 B2 | 6/2009 | Bodin |
| 8,527,445 B2 | 9/2013 | Karins |

(Continued)

FOREIGN PATENT DOCUMENTS

| JP | 2018190431 A | 11/2018 |
| KR | 101925440 B1 | 12/2018 |

(Continued)

OTHER PUBLICATIONS

Hamilton, W. A., Tang, J., Venolia, G., Inkpen, K., Zillner, J., & Huang, D. (Jun. 2016). Rivulet: Exploring participation in live events through multi-stream experiences. In Proceedings of the ACM International Conference on Interactive Experiences for TV and Online Video (pp. 31-42). ACM.

(Continued)

*Primary Examiner* — Hsiungfei Peng
(74) *Attorney, Agent, or Firm* — Caleb D. Wilkes

(57) ABSTRACT

A method, computer system, and computer program product for AI response to live stream video are provided. The embodiment may include receiving a live video stream. The embodiment may also include capturing a plurality of messages from a user group in a social media chat discussion corresponding to the received live video stream. The embodiment may further include determining a discussion pattern within the plurality of captured messages using natural language processing techniques. The embodiment may also include analyzing the live video stream for one or more questions or comments related to the determined discussion pattern. The embodiment may further include generating a response to the one or more questions or comments related to the determined discussion pattern. The embodiment may also include transmitting the generated response to the one or more questions or comments to the social media chat discussion.

20 Claims, 6 Drawing Sheets

(51) Int. Cl.
*H04N 21/232* (2011.01)
*H04N 21/25* (2011.01)
*H04N 21/266* (2011.01)
*H04N 21/2668* (2011.01)
*H04N 21/81* (2011.01)
*H04N 21/8541* (2011.01)
*H04N 21/2187* (2011.01)
*H04N 5/232* (2006.01)
*H04N 21/44* (2011.01)
*H04N 21/4788* (2011.01)

(56) References Cited

U.S. PATENT DOCUMENTS

| | | | |
|---|---|---|---|
| 9,245,280 B2 | 1/2016 | Zheng | |
| 9,668,023 B1* | 5/2017 | Twyman | G06K 9/00677 |
| 10,089,533 B2* | 10/2018 | Katz | G06Q 30/0242 |
| 10,942,026 B2* | 3/2021 | Barton | H04N 7/185 |
| 2006/0224761 A1* | 10/2006 | Howarth | H04N 21/235 |
| | | | 709/231 |
| 2013/0224714 A1 | 8/2013 | Ajmera | |
| 2014/0344359 A1 | 11/2014 | Broz | |
| 2016/0103822 A1* | 4/2016 | George | G06F 16/24522 |
| | | | 704/9 |
| 2016/0286244 A1 | 9/2016 | Chang | |
| 2018/0181656 A1 | 6/2018 | Proctor | |
| 2018/0280796 A1 | 10/2018 | Paradise | |
| 2019/0012387 A1* | 1/2019 | Li | G06Q 50/01 |
| 2019/0116476 A1* | 4/2019 | Qiu | B64C 39/024 |

FOREIGN PATENT DOCUMENTS

| | | |
|---|---|---|
| WO | 2007109010 A3 | 9/2008 |
| WO | 2019027992 W | 2/2019 |

OTHER PUBLICATIONS

Mell et al., "The NIST Definition of Cloud Computing", Recommendations of the National Institute of Standards and Technology, NIST Special Publication 800-145, Sep. 2011, 7 pages.

Shamma, D. A., Marlow, J., & Denoue, L. (Jun. 2019). Interacting with Smart Consumer Cameras: Exploring Gesture, Voice, and AI Control in Video Streaming. In Proceedings of the 2019 ACM International Conference on Interactive Experiences for TV and Online Video (pp. 137-144). ACM.

IBM, "Accelerate your journey to AI with a prescriptive approach", Unlock the value of your data to predict and shape future outcomes, Accessed on Aug. 16, 2021, Analytics / IBM, 7 pages.

IBM, "E-commerce consulting and services", Engineer personalized customer experiences built on a seamless, industry-specific e-commerce platform, Accessed on Aug. 16, 2021, 14 pages.

Wired Brand Lab, "Autonomous vehicles—Watson IoT helps pave an industry revolution", Nov. 1, 2017, IBM Business Operations Blog, 7 pages.

* cited by examiner

AI RESPONSE TO VIEWERS OF LIVE STREAM VIDEO

BACKGROUND

The present invention relates, generally, to the field of computing, and more particularly to live streaming systems.

Live streaming may refer to online streaming media simultaneously recorded and broadcast in real-time. Live streaming may encompass a wide variety of topics, from social media to video games to professional sports. Social media platforms may include the streaming of scheduled promotions and celebrity events as well as streaming between users. For example, live coverage of sporting events is a common application. Further, user interaction via chat rooms has become a major component of live streaming. Social media platforms may often include a feature that allows users to talk to the broadcaster or participate in conversations in chat.

SUMMARY

According to one embodiment, a method, computer system, and computer program product for AI response to live stream video are provided. The embodiment may include receiving a live video stream. The embodiment may also include capturing a plurality of messages from a user group in a social media chat discussion corresponding to the received live video stream. The embodiment may further include determining a discussion pattern within the plurality of captured messages using natural language processing techniques. The embodiment may also include analyzing the live video stream for one or more questions or comments related to the determined discussion pattern. The embodiment may further include generating a response to the one or more questions or comments related to the determined discussion pattern. The embodiment may also include transmitting the generated response to the one or more questions or comments to the social media chat discussion.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
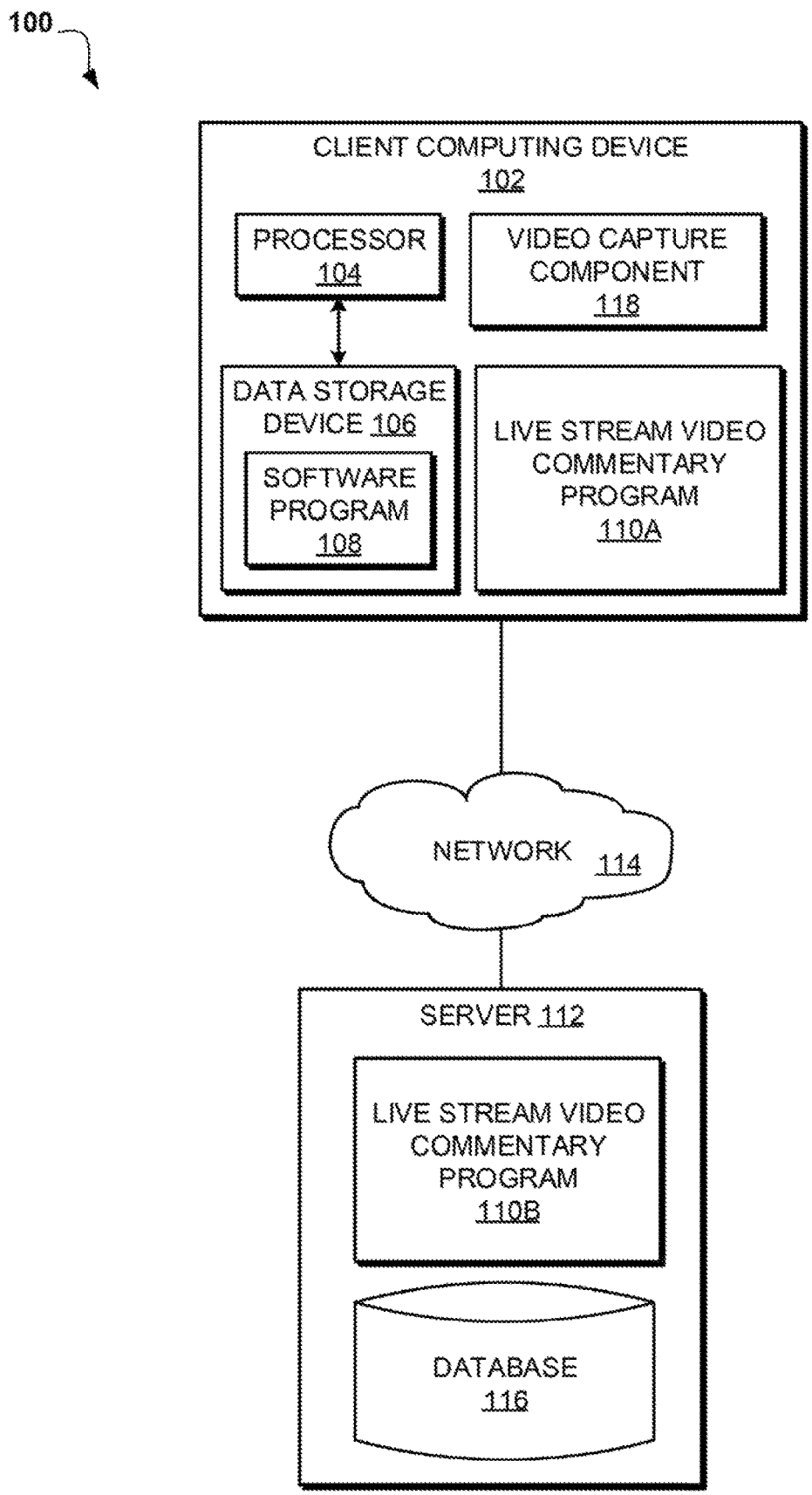
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to live streaming systems. The following described exemplary embodiments provide a system, method, and program product to determine when to initiate video capture from an autonomous vehicle or unmanned aerial vehicle camera to share on a social media site via a live stream video, analyze the live video stream contents to provide commentary on the live video stream and respond to questions being raised by real-time viewers. Therefore, the present embodiment has the capacity to improve the technical field of live streaming systems by allowing a system to autonomously respond to real-time viewers of social media live stream and initiate video capture to share via live stream video based on learned value of objects and discussion pattern metrics found in an AI repository.

As previously described, live streaming may refer to online streaming media simultaneously recorded and broadcast in real-time. Live streaming may encompass a wide variety of topics, from social media to video games to professional sports. Social media platforms may include the streaming of scheduled promotions and celebrity events as well as streaming between users. For example, live coverage of sporting events is a common application. Further, user interaction via chat rooms has become a major component of live streaming. Social media platforms may often include a feature that allows users to talk to the broadcaster or participate in conversations in chat.

Live stream video on social sites may be used for a variety of reasons such as an event, a program, a promotion of a brand, social causes, etc. Autonomous vehicles or unmanned aerial vehicles or a traditional vehicle that does not have a person in that vehicle may be used to capture video and share via social media live stream. However, with the enormous number of messages being sent and received, it may be necessary to interact with live stream viewers in real-time and respond to different questions as quickly as possible. Therefore, it may be advantageous to implement a system to have the intelligence to analyze questions from viewers in real-time and dynamically create a response or commentary of live stream video and control the live video stream coverage of contents when objects identified are of learned significance.

According to one embodiment, the present invention may preconfigure an autonomous vehicle or an unmanned aerial vehicle and monitor group discussion on a social media site. In at least one other embodiment, the present invention may also initiate a live video stream based on contextual analysis of surroundings. In yet another embodiment, the present invention may further autonomously respond to questions from live video streams and alter the path of autonomous vehicles or unmanned aerial vehicles or video capture and sharing.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for determining when to initiate video capture from an autonomous vehicle or an unmanned aerial vehicle camera to share on a social media site via a live stream video and analyzing the live video stream contents to provide commentary on the live video stream and respond to questions being raised by real-time viewers.

Referring to FIG. 1, an exemplary networked computer environment 100 is depicted according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is to host and run a software program 108, a video capture component 118 that may be mounted on any type of autonomous vehicle to capture live stream video, and a live stream video commentary program 110A that may include an AI system that may perform analysis on live video and may interact with the video capture component 118 mounted on an autonomous vehicle or an unmanned aerial vehicle and communicate with the server 112 via the communication network 114, in accordance with one embodiment of the invention. Client computing device 102 may be, for example, any type of an unmanned vehicle equipped with a video capture device, autonomous vehicle or an unmanned aerial vehicle. As will be discussed with reference to FIG. 4, the client computing device 102 may include internal components 402 a and external components 404a, respectively.

The server computer 112 may be a laptop computer, netbook computer, personal computer (PC), a desktop computer, or any programmable electronic device or any network of programmable electronic devices capable of hosting and running a live stream video commentary program 110B and a database 116 and communicating with the client computing device 102 via the communication network 114, in accordance with embodiments of the invention. As will be discussed with reference to FIG. 4, the server computer 112 may include internal components 402 b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the live stream video commentary program 110A, 110B may be a program capable of analyzing social media interaction patterns of real-time viewers to identify if any additional areas or contents should be covered in a live video stream. The live stream video commentary process is explained in further detail below with respect to FIG. 2.

Figure 2:
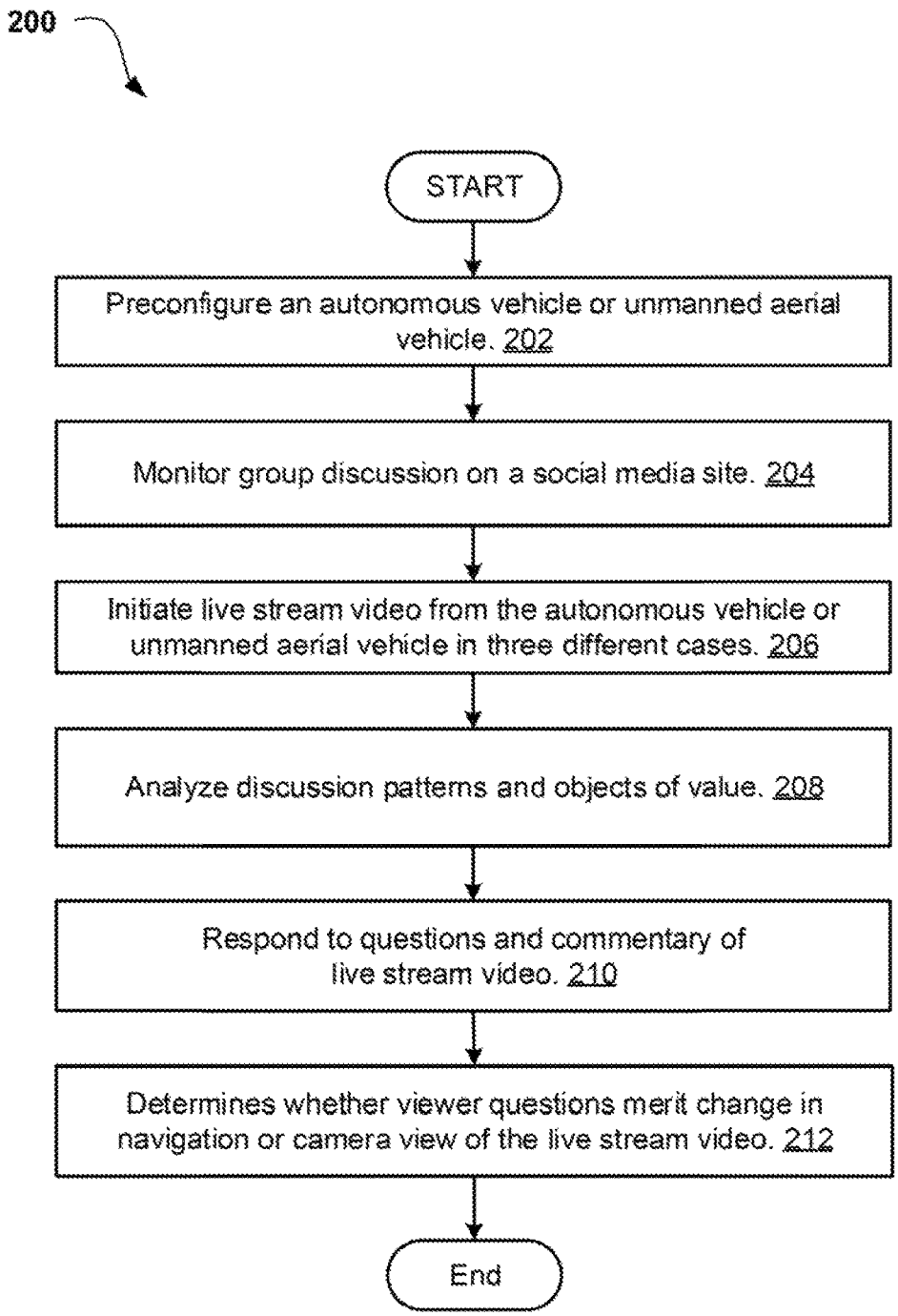
FIG. 2 is an operational flowchart illustrating a live stream video commentary process according to at least one embodiment.

Referring to FIG. 2, an operational flowchart illustrating a live stream video commentary process 200 is depicted according to at least one embodiment. At 202, the live stream video commentary program 110A, 110B preconfigures an autonomous vehicle or unmanned aerial vehicle. According to one embodiment, the live stream video commentary program 110A, 110B may register an autonomous vehicle or an unmanned aerial vehicle with the live stream video commentary program 110A, 110B. An autonomous vehicle or an unmanned aerial vehicle may be connected to a camera system that may capture video and share the captured video through the network 114. In at least one embodiment, the use of autonomous vehicles or unmanned aerial vehicles may be free if owned and controlled by the client computing device 102. In other cases, autonomous vehicles or unmanned aerial vehicles may be owned and controlled by a third party and such vehicles may be registered with the live stream video commentary program 110A, 110B for certain service fees based on transportation cost or other cost associated with video capture for live stream. The live stream video commentary program 110A, 110B may be equipped with an AI repository of learned patterns of discussion metrics and objects of value retrieved from a database. These may be metrics learned from historical social media group discussion questions and comments for live stream video that are pre-defined for the live stream video commentary program 110A, 110B to respond in later use. Some common metrics that may be used may include topics with a threshold number of viewers of a live stream with same or similar questions or comments, specific users of defined significance or influence, a topic or brand that may have been a previously generated threshold of monetary or other types of values. A learned object of value may include humans (i.e. celebrity, athlete, professor, etc.) that may be associated with a brand, animals, inanimate objects of interest (i.e. landscape, structures, etc.).

At 204, the live stream video commentary program 110A, 110B monitors group discussion on a social media site. According to one embodiment, the live stream video commentary program 110A, 110B may be engaged based on different entries points from which to start. In one embodiment, users of a social media site may engage in a group discussion. At this stage, the live stream video commentary program 110A, 110B may not require that live stream video exist. However, the live stream video commentary program 110A, 110B at this stage may monitor and determine whether live stream video is associated with a group discussion already in progress. For instance, a group discussion with live stream video of an event may have begun already and viewers of the live stream may already be commenting and raising various questions. In this case, the live stream video commentary program 110A, 110B may initiate live stream when an object of value is identified to capture and share live stream video although the group discussion started without live stream.

At 206, the live stream video commentary program 110A, 110B initiates live stream video from an autonomous vehicle or an unmanned aerial vehicle in three different scenarios. According to one embodiment, the live stream video commentary program 110A, 110B may initiate a live stream of video from an autonomous vehicle or an unmanned aerial vehicle in three different scenarios. In one embodiment, the live stream video commentary program 110A, 110B may determine that a social media group discussion is planned to commence for a specific event that needs live stream video that communicates with appropriate autonomous vehicles or unmanned aerial vehicles within the location of the event to initiate the capture and sharing of video for the live stream. In another embodiment, the live stream video commentary program 110A, 110B may determine that a discussion pattern observed in a group discussion may match a certain pattern found in a repository and compare the cost of capture associated with an autonomous vehicle or an unmanned aerial vehicle to the value of initiating live stream for the group discussion. In yet another embodiment, the live stream video commentary program 110A, 110B may determine that an object of interest is found in a repository that may be a match in real-time for an object found in a current environment using an autonomous vehicle camera or an unmanned aerial vehicle camera. The live stream video commentary program 110A, 110B may then compare the cost of capture associated with an autonomous vehicle or an unmanned aerial vehicle to the value of initiating live stream based on an anticipated number of viewers.

At 208, the live stream video commentary program 110A, 110B analyzes discussion patterns and objects of value. According to one embodiment, the live stream video commentary program 110A, 110B may include a repository with previously-learned patterns of discussion and objects that have previously been determined to be of value. For example, the live stream video commentary program 110A, 110B may include a repository that may store object-related data with respect to certain events, people, animals and inanimate objects, such as manmade structures or natural environments. In another example, the live stream video commentary program 110A, 110B may receive information that a previous social media live stream for celebrity A and brand XYZ attracted 100,000 viewers and determined to have direct monetary gain for brand XYZ. Discussion patterns may include questions, comments, answers, number of viewers, etc. The live stream video commentary program 110A, 110B may then perform a real-time analysis on a current group discussion for live stream video to determine if the currently-observed discussion pattern, topic, number of users, object of interest, brand implication, for example, may match the stored discussion patterns or objects of value. The live stream video commentary program 110A, 110B may utilize a natural language process to extract and search for names, aliases or object of interest, such as a celebrity name. In at least one other embodiment, the live stream video commentary program 110A, 110B may evaluate certain objects and topics to determine if there are learning objects of interest with potential monetary value. Once the live stream video commentary program 110A, 110B identifies objects of interest with value in a current group discussion, the live stream video commentary program 110A, 110B may then send this data to an autonomous vehicle or an unmanned aerial vehicle that was registered with the system to search via image comparison to find the subject-object in the surroundings.

At 210, the live stream video commentary program 110A, 110B responds to questions and commentary of live stream video. According to one embodiment, the live stream video commentary program 110A, 110B may monitor a social network site and an ongoing group discussion involving a live stream video to identify viewers' comments and questions, etc. The contextual analysis may be performed on the content posted for each user in real-time as the live stream video commentary program 110A, 110B identities questions being raised and comments being posted on a real-time basis. The live stream video commentary program 110A, 110B may then analyze video feed being captured and sensor feed from the surroundings (i.e. location, weather, surrounding context) to identify answer for each user. In at least one other embodiment, the live stream video commentary program 110A, 110B may utilize a historical knowledge corpus about similarly identified content to identify answers for the question, and by using such questions and answers, the live stream video commentary program 110A, 110B may construct content for commentary. The generated commentary of the live video feed may be delivered along with the live stream video.

At 212, the live stream video commentary program 110A, 110B determines whether viewer questions merit a change in navigation or camera view of live stream video. According to one embodiment, the live stream video commentary program 110A, 110B may determine if additional coverage using the live stream video needs to be done based on the contextual analysis of the currently raised comments and questions from real-time viewers. The live stream video commentary program 110A, 110B may identify appropriate camera parameter settings, such as zoom level, change in direction, etc., to direct the live stream video commentary program 110A, 110B to control autonomous vehicle cameras or unmanned aerial vehicle cameras for additional coverage. In at least one other embodiment, the live stream video commentary program 110A, 110B may determine that the navigation path of the autonomous vehicle or the unmanned aerial vehicle may need to be altered to achieve the camera view in support of live stream viewer questions. If the value of either the discussion pattern or object of interest value threshold is met with consideration for cost of additional video capture, the live stream video commentary program 110A, 110B may then direct the autonomous vehicle or unmanned aerial vehicle to change its navigation path or change its camera angle in support of stream viewer questions or comments.

Figure 3:
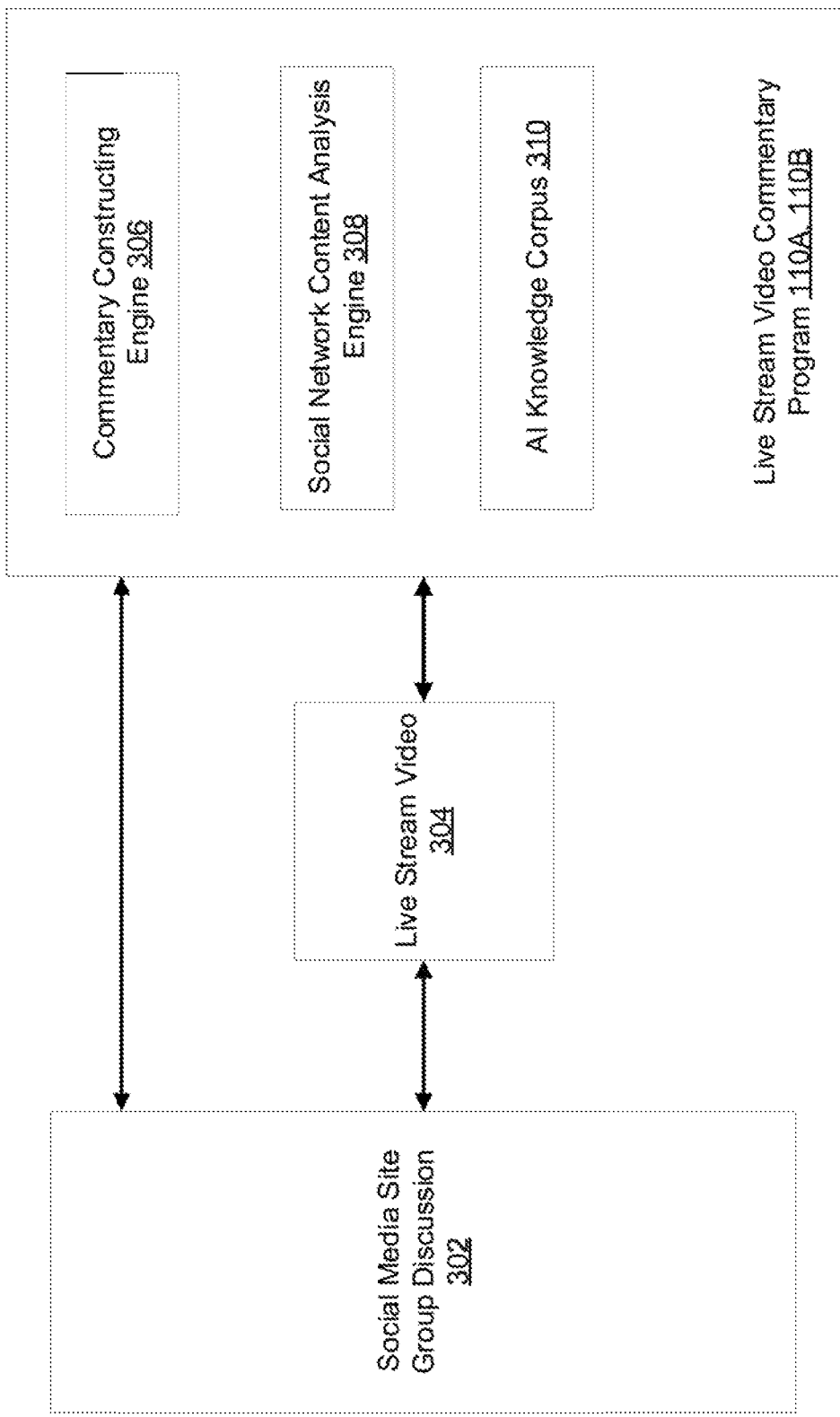
FIG. 3 is a block diagram of exemplary illustration of a live stream video commentary process according to at least one embodiment.

Referring to FIG. 3, a block diagram of an exemplary live stream video commentary process is depicted according to at least one embodiment. In at least one embodiment, the social media site group discussion 302 may include a group discussion that may require a live stream video 304. The live stream video may be captured by an autonomous vehicle camera or an unmanned aerial vehicle camera. The live stream video commentary program 110A, 110B may include a commentary constructing engine 306, a social network content analysis engine 308 and an AI knowledge corpus 310. For example, the live stream video commentary program 110A, 110B may utilize the commentary constructing engine to receive and analyze the content of the social media site group discussion 302. The social network content analysis engine may analyze the content of the group discussion and identify potential value of objects or discussion patterns to compare with similar data stored in the AI knowledge corpus. The live stream video commentary program 110A, 110B may also utilize the commentary constructing engine and the AI knowledge corpus to generate an answer or a comment to certain questions being raised by a current viewer of live stream video and send such answers or comments back to the social media site group discussion 302.

It may be appreciated that FIGS. 2-3 provide only an illustration of one implementation and do not imply any limitations with regard to how different embodiments may be implemented. Many modifications to the depicted environments may be made based on design and implementation requirements. For example, in at least one embodiment, the live stream video commentary program 110A, 110B may process multiple questions and comments received on multiple social media sites. In yet another embodiment, the live stream video commentary program 110A, 110B may utilize an alert system for human operators to intervene in cases of criminal activity using live stream video.

Figure 4:
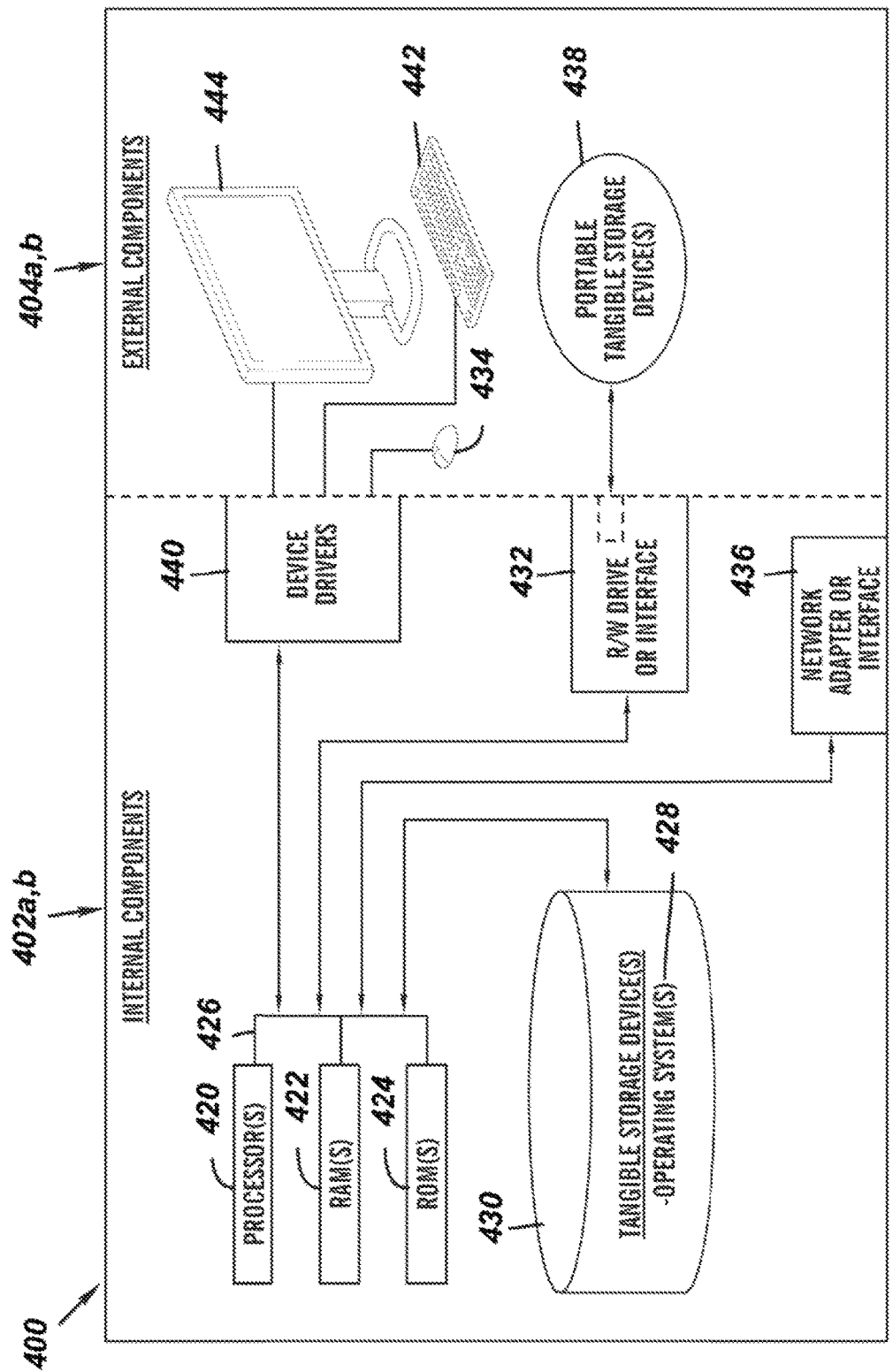
FIG. 4 is a block diagram of internal and external components of computers and servers depicted in FIG. 1 according to at least one embodiment.

FIG. 4 is a block diagram of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smartphone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the live stream video commentary program 110A in the client computing device 102 and the live stream video commentary program 10B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes an R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the live stream video commentary program 110A, 110B can be stored on one or more of the respective portable computer-readable tangible storage devices 438, read via the respective R/W drive or interface 432 and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the live stream video commentary program 110A in the client computing device 102 and the live stream video commentary program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the live stream video commentary program 110A in the client computing device 102 and the live stream video commentary program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
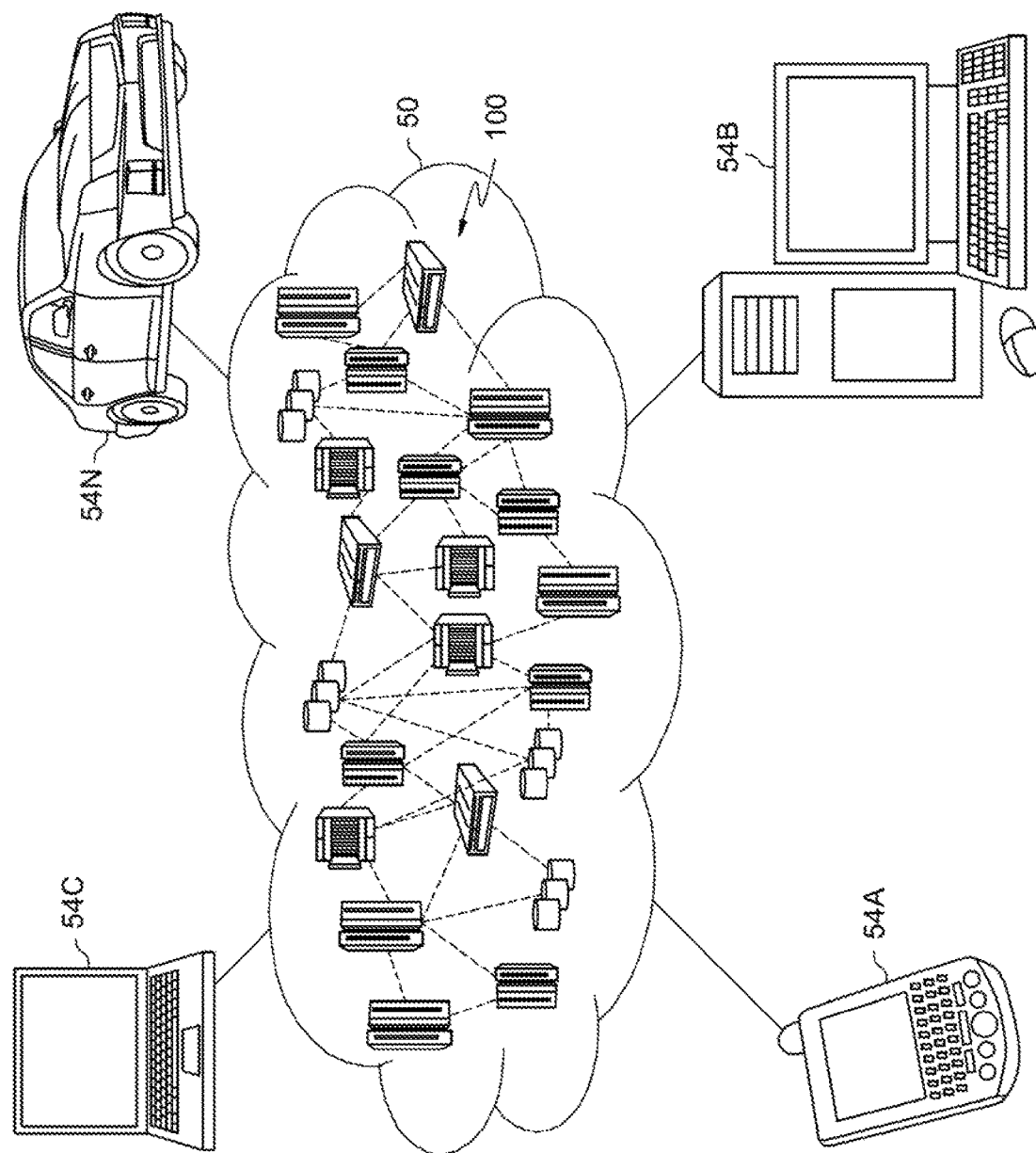
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
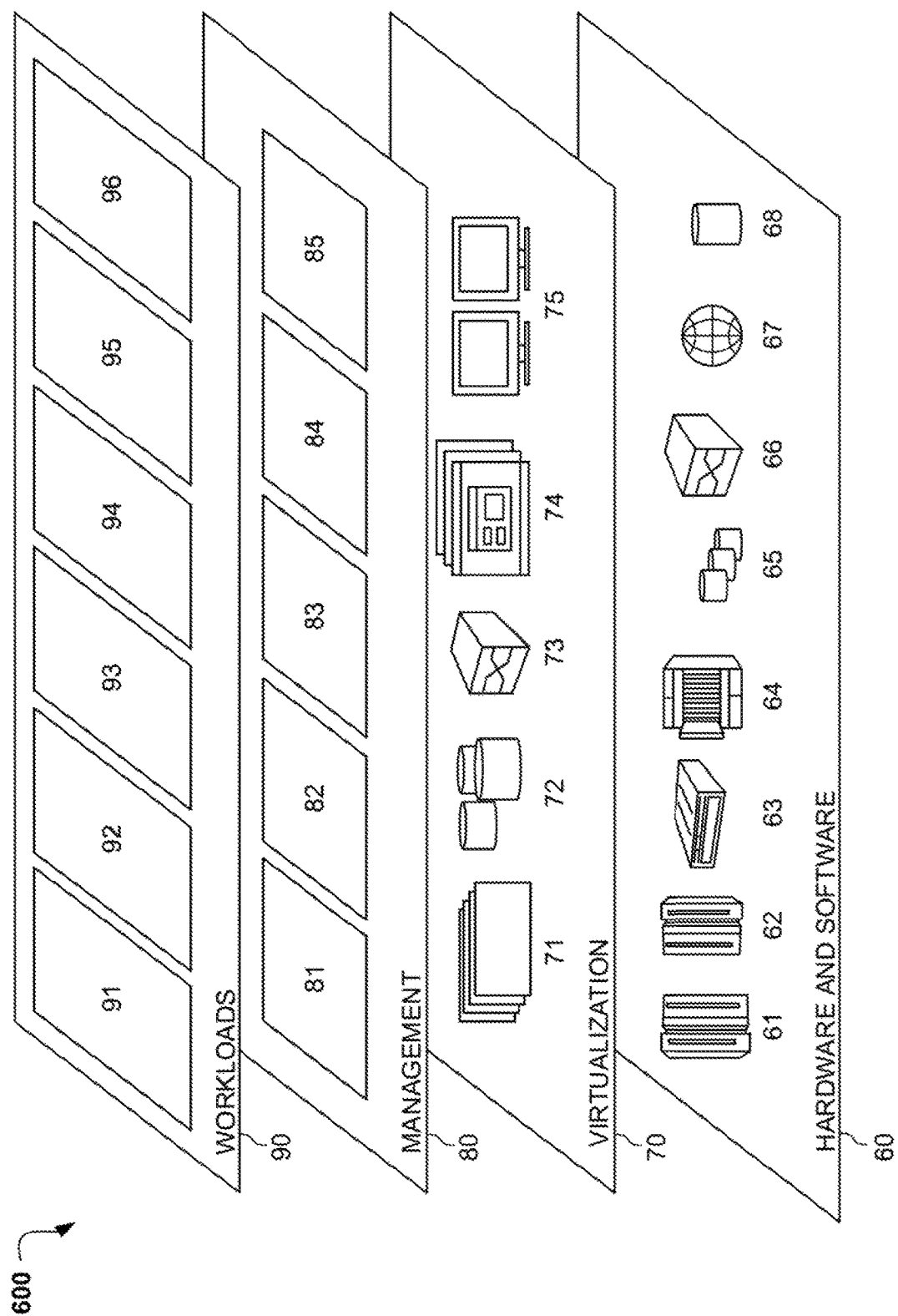
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and live stream video commentary 96. Live stream video commentary 96 may relate to automatically responding to real-time viewers of live stream video and altering a path of an unmanned aerial vehicle camera or an autonomous vehicle.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for AI response to live stream video, the method comprising:
   determining when to initiate a live video stream based on a comparison of a cost associated with operating an autonomous vehicle camera and a potential value of the video live stream;
   receiving the live video stream;
   capturing a plurality of messages from a user group in a social media chat discussion corresponding to the received live video stream;
   determining a discussion pattern within the plurality of captured messages using natural language processing techniques;
   analyzing the live video stream for the determined discussion pattern;
   generating a response to the determined discussion pattern;
   transmitting the generated response to the social media chat discussion;
   determining whether the determined discussion pattern requires a change in navigation of an autonomous vehicle, the autonomous vehicle comprising the autonomous vehicle camera capturing the live video stream; and
   in response to the determining that the determined discussion pattern requires a change in navigation of the autonomous vehicle, directing the autonomous vehicle to change its course of navigation.

2. The method of claim 1, further comprising:
   monitoring multiple social web site online chats to respond to multiple questions or answers almost simultaneously.

3. The method of claim 1, further comprising:
   comparing the determined discussion pattern within the plurality of the captured messages with a similar discussion pattern stored in a database.

4. The method of claim 1, further comprising:
   allowing a user to intervene in an operation of an autonomous vehicle camera in case of criminal activity.

5. The method of claim 1, wherein the changed course of navigation of the autonomous vehicle changes a view of the camera of the autonomous vehicle.

6. The method of claim 1, further comprising:
   determining whether the determined discussion pattern requires a change in a parameter setting of the camera of the autonomous vehicle; and
   in response to the determining that the determined discussion pattern requires a change in a parameter setting of the camera, directing the camera to change the parameter setting.

7. The method of claim 6, wherein the parameter setting comprises at least one member selected from a group consisting of a zoom level and a direction of the camera.

8. A computer system for AI response to live stream video, the computer system comprising:
   one or more processors, one or more computer-readable tangible storage media, and program instructions stored on at least one of the one or more tangible storage media for execution by at least one of the one or more processors to cause the computer system to perform a method comprising:
   capturing messages from a user group in a social media chat discussion;
   determining a discussion pattern within the captured messages using natural language processing techniques;
   comparing the determined discussion pattern with patterns saved in a repository to identify an event;
   determining a potential value of a video live stream for the event based on the comparing;
   determining a cost associated with operating an autonomous vehicle to produce video of the event;
   in response to determining that the potential value exceeds the cost associated with operating the autonomous vehicle to produce video for the event, initiating the live stream video by capturing video with a camera of the autonomous vehicle;
   continuing to monitor the social media chat discussion;
   determining whether the continued social media chat discussion requires a change in navigation of the autonomous vehicle; and
   in response to determining that the change is required, directing the autonomous vehicle to change its course of navigation.

9. The computer system of claim 8, wherein the method further comprises:
   monitoring multiple social web site online chats to respond to multiple questions or answers almost simultaneously.

10. The computer system of claim 8, wherein the method further comprises:
    allowing a user to intervene in an operation of the camera of the autonomous vehicle in case of criminal activity.

11. The computer system of claim 8, wherein the method further comprises allowing a user to intervene in an operation of the camera of the autonomous vehicle in case of criminal activity.

12. A computer program product for AI response to live stream video, the computer program product comprising:
    one or more computer-readable tangible storage media and program instructions stored on at least one of the one or more tangible storage media, the program instructions executable by a processor of a computer to perform a method, the method comprising:
    receiving a live video stream;
    capturing a plurality of messages from a user group in a social media chat discussion corresponding to the received live video stream;
    determining a discussion pattern within the plurality of captured messages using natural language processing techniques to extract information related to names, aliases, or objects of interest, wherein the information is evaluated to determine if there are learning objects of interest with potential monetary value, wherein the learning objects of interest with potential monetary value include humans that are associated with a brand, animals and inanimate objects;
    analyzing the live video stream for one or more questions or comments related to the determined discussion pattern;
    generating a response to the one or more questions or comments related to the determined discussion pattern;
    transmitting the generated response to the one or more questions or comments to the social media chat discussion;

determining whether the one or more questions or comments requires a change in navigation of an autonomous vehicle or camera view of the live video stream; and in response to the determining that the one or more questions or comments requires a change in navigation, directing a camera of an autonomous vehicle to change its course of navigation.

13. The computer program product of claim 12, wherein the method further comprises:

initiating the live video stream when objects within a surrounding area are identified as a learned value that is stored in a database, wherein the learned value comprises patterns of discussion metrics and objects of value learned from historical social media group discussion questions and comments.

14. The computer program product of claim 12, wherein the method further comprises:

monitoring multiple social web site online chats to respond to multiple questions or answers almost simultaneously.

15. The computer program product of claim 12, wherein the method further comprises:

comparing the determined discussion pattern within the plurality of the captured messages with a similar discussion pattern stored in a database.

16. The computer program product of claim 12, wherein the method further comprises:

determining when to initiate the live video stream based on a comparison of a cost associated with operating an autonomous vehicle camera and a potential value of the video live stream.

17. The computer program product of claim 12, wherein the inanimate objects are selected from a group consisting of manmade structures and natural environment landscape structures.

18. A computer system for AI response to live stream video, the computer system comprising:

one or more processors, one or more computer-readable tangible storage media, and program instructions stored on at least one of the one or more tangible storage media for execution by at least one of the one or more processors to cause the computer system to perform a method comprising:

capturing messages from a user group in a social media chat discussion;

determining a discussion pattern within the captured messages using natural language processing techniques;

comparing the determined discussion pattern with patterns saved in a repository to identify an event;

determining a potential value of a video live stream for the event based on the comparing;

determining a cost associated with operating an autonomous vehicle to produce video of the event;

in response to determining that the potential value exceeds the cost associated with operating the autonomous vehicle to produce video for the event, initiating the live stream video by capturing video with a camera of the autonomous vehicle;

continuing to monitor the social media chat discussion;

determining whether the continued social media chat discussion requires a change in a parameter setting of the camera of the autonomous vehicle; and in response to the determining that the continued social media chat discussion requires a change in a parameter setting of the camera, directing the camera to change the parameter setting.

19. The computer system of claim 18, wherein the parameter setting comprises at least one member selected from a group consisting of a zoom level, a direction of the camera, and an angle of the camera.

20. The computer system of claim 18, wherein the method further comprises monitoring multiple social web site online chats to respond to multiple questions or answers from the multiple social web site online chats.

* * * * *